Nov. 16, 1943. J. AKINS 2,334,302
SCREW TURBINE
Filed May 27, 1942
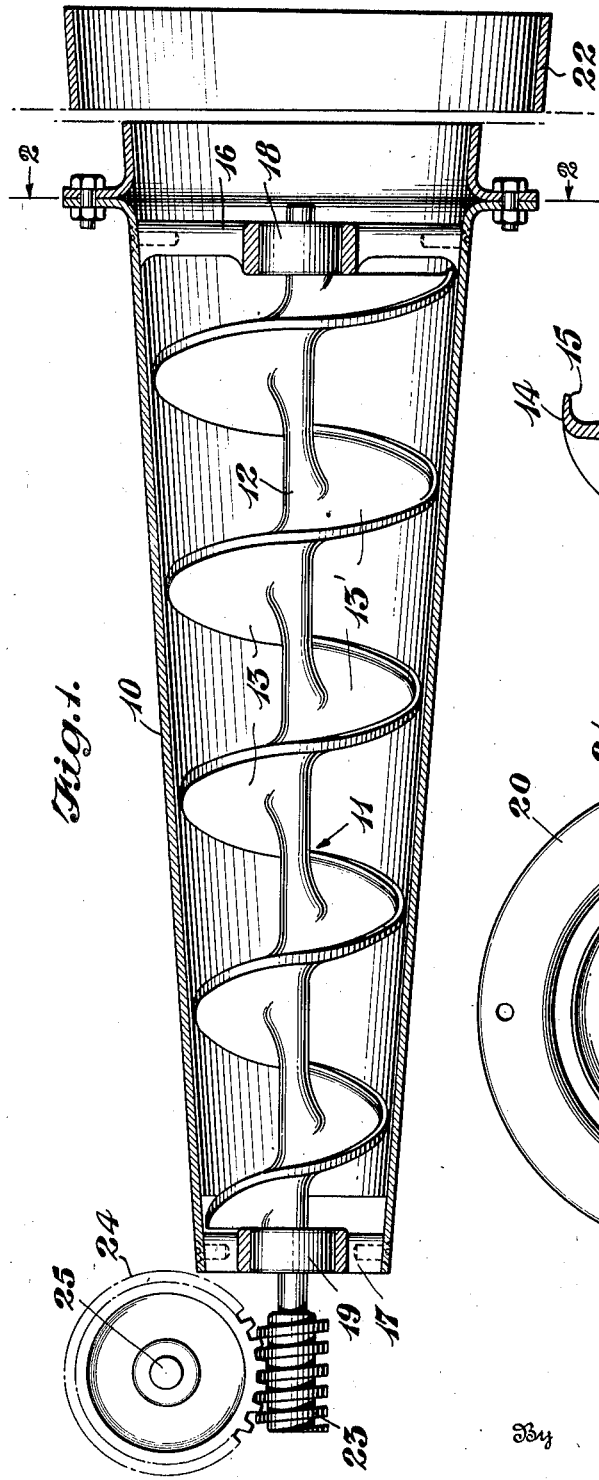
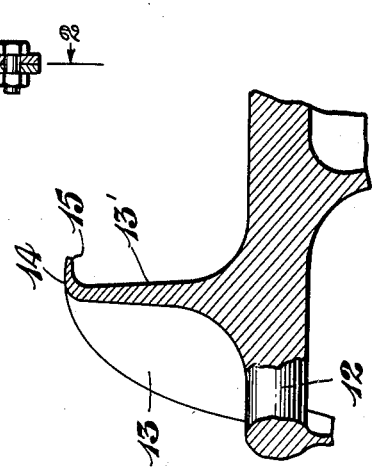
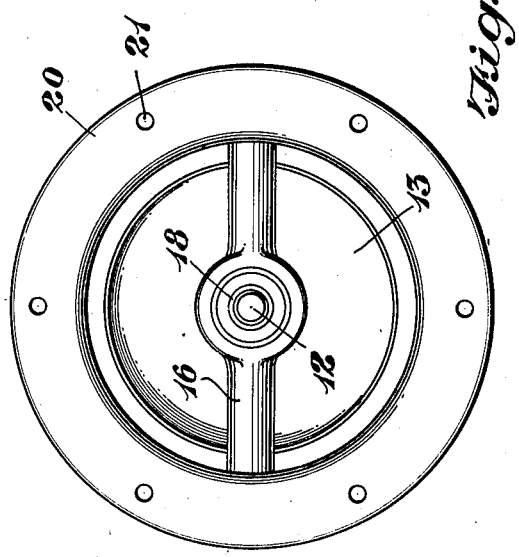
Inventor
Jake Akins,
By
Attorney Patented Nov. 16, 1943

2,334,302

UNITED STATES PATENT OFFICE 2,334,302

SCREW TURBINE

Jake Akins, Statesboro, Ga., assignor of one-half to Alfred A. Dorman, Statesboro, Ga.

Application May 27, 1942, Serial No. 444,727

6 Claims. (Cl. 253—31)

This invention relates to turbines of the axial flow, screw rotor type, and an object of the same is to provide a turbine unit which may be quickly and easily installed in various locations and under varying conditions, and which will deliver high power output per size of unit.

Another object of the invention is to provide a turbine of the type specified utilizing a stator casing and coacting rotor screw of tapered contour from the inlet to the outlet ends thereof, the propeller being non-displaceably mounted in the casing and the unit as a whole being compact and capable of delivering maximum power for its size.

A further object of the invention is to provide a turbine of the axial-flow type wherein there is a minimum of slippage or loss between the stator and rotor and wherein the efficiency per volume or head-pressure of water is relatively high.

The foregoing and other objects and advantages will become apparent in view of the foregoing description taken in conjunction with the drawing, wherein:

Fig. 1 is a substantially central longitudinal section of a turbine in accordance with the invention;

Fig. 2, an end elevation taken substantially on the line 2—2, Fig. 1; and,

Fig. 3, an enlarged fragmentary section of the turbine screw or rotor.

Referring to the drawing in detail, the turbine assembly or unit comprises a stator in the form of a casing, generally indicated at 10, which is of tapered contour from the enlarged inlet to the reduced outlet end thereof. This casing may be made of non-corrosive sheet metal, composition or cementitious material or the like or it may be a bronze casting. However, it is preferred to utilize a stator casing which may be transported from point to point as desired.

Within the casing a turbine rotor of the screw type is mounted and is generally indicated at 11, the rotor comprising a shaft 12 having thereon a spiral blade or vane 13. While the blade is shown in Fig. 3 as being cast integrally with the shaft 12, it will be understood that it may be made of relatively thin gauge metal and rolled, extruded or otherwise suitably formed and then secured as by welding to the shaft.

The spiral vane or blade 13 follows the tapered contour of the casing 10, and the outer edge of the blade is formed with a flange 14 which projects forwardly or towards the inlet end of the casing. This flange 14 provides in conjunction with the active or working face 13' of the blade a generally dished construction, while at the same time the flange lies relatively close to the inner surface of the casing and reduces the slippage or leakage loss at this point. The flange is preferably of relatively wide dimensions and has its forward or leading edge tapered inwardly, as at 15, toward the active face 13' of the blade, thereby further reducing the tendency towards slippage or leakage between the flange and the casing.

The shaft 12 with its blade or vane 13 is preferably rigidly mounted to the casing 10, and accordingly, bearing brackets or members 16 and 17 are fixed to the casing at the inlet and outlet ends thereof and are provided with bearings 18 and 19 for the opposite ends of the shaft 12. The brackets 16 and 17 may be made of suitable non-corrosive material and should be sufficiently rugged to withstand the pressures to which the unit may be subjected and at the same time prevent any relative displacement between the rotor and its casing.

The front end of the casing is preferably turned outwardly or otherwise suitably provided with a mounting flange 20 formed with a plurality of bolt holes 21, and connected to this flange is a draft casing or tube 22, which may be attached to and form part of the unit, or it may be installed prior to installation of the unit.

The rear end of the shaft 12 is provided with a worm 23 adapted to mesh with a worm gear 24 mounted on a drive shaft 25, said shaft extending to the member to be driven.

In operation, the turbine may be disposed either vertically, horizontally or at various angles between the vertical and horizontal, and may be conveniently located in a draft tube, a runway at the base of a dam, in the bed of a stream, or wherever suitable head pressure is available. The water entering the casing 10 at the forward or enlarged end thereof engages the active face of the vane or blade 13 and causes rotation of the shaft 12. Due to the flanged and generally dished construction of the blade 13, maximum efficiency is obtained, there being reduced slippage or leakage between the blade and casing. Actual experience has demonstrated that considerable power may be made available with relatively low head pressure, such as where only small streams or brooks can be used for obtaining such pressure. The unit may be easily and quickly installed and may be readily transported from place to place wherever it can be advantageously utilized.

It will be understood that certain limited changes in construction and design of the improved turbine may be adopted without departing from the spirit or scope of the invention as defined by the appended claims.

What is claimed is:

1. A turbine comprising a stator casing of tapered contour from its inlet to its outlet ends and a rotor mounted in said turbine and comprising a shaft having a spiral blade or vane thereon which follows the taper of the casing, said blade being formed with a flange on the outer edge thereof extending towards the inlet end of the casing.

2. A turbine comprising an elongated stator casing of tapered contour from its inlet to its outlet ends and a rotor mounted in said casing and comprising a shaft having a spiral blade thereon which follows the tapered contour of the casing, said blade having a flange extending towards the inlet end of the casing, there being a minimum of clearance between the flange and inner surface of the casing and said flange having its leading edge tapered inwardly towards the working or active face of the blade.

3. A turbine comprising an elongated casing of tapered contour from its enlarged inlet to its reduced outlet end and a rotor mounted in said casing and comprising a shaft having a spiral blade thereon which follows the tapered contour of the casing, the outer edge of the blade being formed with a forwardly extending flange which provides in conjunction with the active face of the blade a generally dished construction, there being a minimum of clearance between the flange and the inner surface of the casing, and means rigidly connecting the said shaft to the casing.

4. A turbine comprising an elongated casing of tapered contour from its enlarged inlet end to its reduced outlet end and a rotor mounted in said casing and comprising a shaft having a spiral blade thereon formed with an extended flange on the outer edge thereof which projects towards the inlet end of the casing, there being a minimum of clearance between said flange and the adjacent inner surface of the casing, and bearing brackets rigidly connecting the opposite ends of the shaft to the casing and holding rotor and casing together as a non-displaceable unit.

5. A turbine comprising an elongated casing of tapered contour from its inlet to its outlet end, the larger end of the casing constituting the inlet end and the smaller end thereof constituting the discharge end, a rotor mounted in said casing and comprising a shaft having a spiral blade thereon with an extended flange on the outer edge thereof which projects toward the inlet end of the casing and lies in a plane substantially coincident with the adjacent inner surface of the casing, there being a minimum of clearance between said flange and the said inner surface of the casing, and means rigidly connecting the opposite ends of the shaft to the casing and holding the rotor and casing together as a non-displaceable unit.

6. A turbine comprising an elongated casing or tapered contour from its inlet to its outlet end, the larger end of the casing constituting the inlet end and the smaller end thereof constituting the discharge end, a rotor mounted in said casing and comprising a shaft having a spiral blade formed thereon, the outer edge portion of said blade being formed with an extended flange which projects toward the inlet end of the casing, the body of said blade extending in a plane substantially normal to the longitudinal axis of the casing and said flange extending in a plane substantially coincident with the adjacent inner surface of the casing, and means rigidly connecting the shaft to the casing.

JAKE AKINS.